Figure 1:
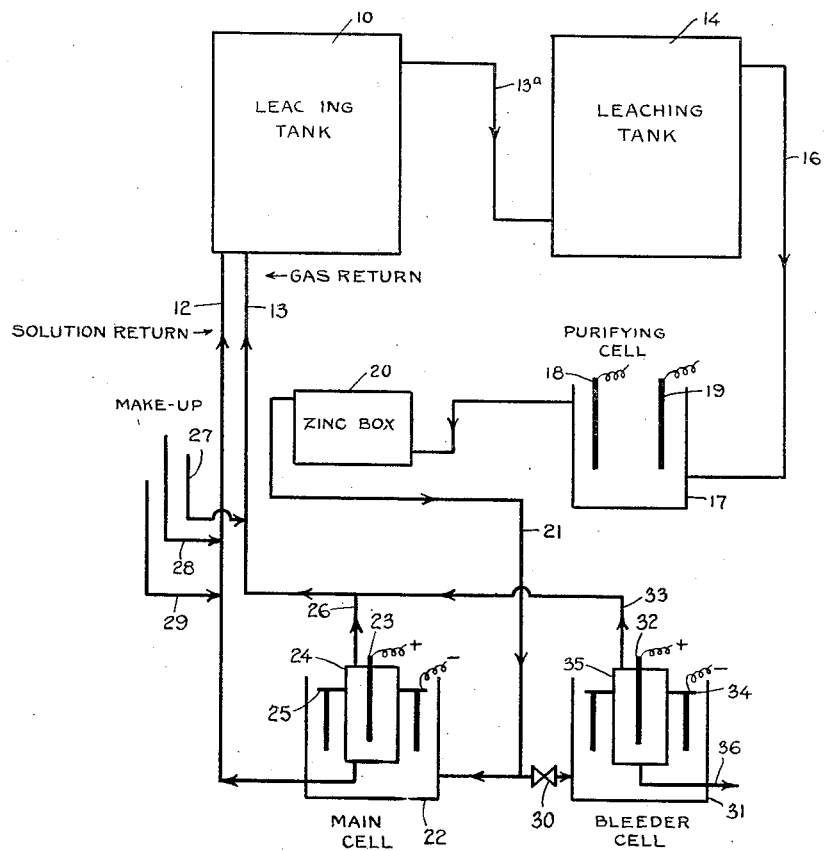

June 15, 1926.

E. W. HALE ET AL 1,588,679

ORE TREATING PROCESS

Filed June 22, 1925    2 Sheets-Sheet 1

INVENTORS
Edwin W. Hale
Colin G. Fink
BY Geo. G. Hyde
THEIR ATTORNEY

June 15, 1926.

E. W. HALE ET AL 1,588,679

ORE TREATING PROCESS

Filed June 22, 1925  2 Sheets-Sheet 2

INVENTOR
Edward W. Hale
Colin G. Fink
BY
ATTORNEY

Patented June 15, 1926.

1,588,679

UNITED STATES PATENT OFFICE.

EDWIN W. HALE, OF CLEVELAND, OHIO, AND COLIN G. FINK, OF NEW YORK, N. Y., ASSIGNORS OF ONE-HALF TO THE DORR COMPANY, OF NEW YORK, N. Y., A CORPORATION OF DELAWARE.

ORE-TREATING PROCESS.

Application filed June 22, 1925. Serial No. 38,650.

This invention pertains to the extraction of metals from sulfides and is especially directed to the recovery of metals from sulfide ores by the use of bromine. The improved process is of the type in which the sulfur is replaced by a halogen, forming a soluble metallic salt from which the metal may be obtained by electrolysis. It is primarily adapted for the recovery of zinc from blende, an operation in which the use of chlorine to react with the sulfide in blende has been proposed; but although chlorine is universally recognized by those skilled in the art as being much more active chemically than bromine, in this particular operation the chlorine in practice replaces the sulfur so slowly that the operation has not met with general commercial success.

We have found however that bromine is unexpectedly active in replacing the sulfur, attacking the blende vigorously and producing zinc bromide; but the advantage of this rapid reaction is to some extent offset by certain disadvantages which under some conditions may attend the use of bromine. In endeavoring to avoid these while retaining the benefits attendant upon the use of bromine we have further found that, although chlorine reacts very slowly with the sulfide, it replaces the bromine in a bromide of the metal with great vigor; and the resulting chloride, with any incidental chlorine compound or gaseous chlorine, can be treated without encountering to a material extent the difficulties incident to the exclusive use of bromine.

The principal object of this invention is therefore to replace the sulfur in metallic sulfides with bromine, and then to replace the bromine in the resulting bromides with chlorine. The latter step releases the bromine, which is free to react with additional sulfide; and in the presence of an excess of chlorine these steps are cyclic and so rapid that the bromine in effect acts as a catalyst and need be present only in relatively small amounts.

The bromine and chlorine may be supplied in any form suitable for effecting the desired reaction. For instance, the bromine may be employed in elemental form, preferably in solution; and it has been found that while bromine is only slightly soluble in water, it is readily soluble in halogen salt solutions. The bromine may also be present in the form of a salt such as ferric bromide. The chlorine is preferably introduced in gaseous form. In carrying out our process various acids may be formed as a result of the reaction of the halogen with the sulfides, such for instance as hydrobromic acid and sulfuric acid. While the solution containing these acids may be treated as desired for recovery of the metal, we have provided a step whereby the acids are broken up, the bromine is retained in the leaching solution in a form which can be regenerated for reuse as hereinafter explained, and a further extraction of metal is obtained. We accomplish these objects by producing a reaction between the acids and a suitable compound such as the oxide of the metal which is being extracted, thereby forming further metallic compounds from which the metal may be recovered in the latter part of the process. For instance, where blende is leached, the leaching solution containing the acids may be passed through zinc oxide, forming zinc bromide and zinc sulfate. A further advantage of this step in zinc leaching is the precipitation of iron salts, which normally remain dissolved in the acid solution but are precipitated when the latter are neutralized. The leaching solution is treated to recover the metal by electrolytic methods, in which the chlorine gas, bromine and leach liquor may be regenerated. Where the solution contains the usual impurities, such as soluble salts of various metals, as would be the case ordinarily in leaching blende, the impurities should be removed before the main electrolysis takes place. This may be done in any desired well known manner; but we have found it more efficient to subject the solution to a preliminary electrolysis in which zinc anodes are employed where a zinc leaching solution is being treated. With this arrangement a large percentage of the total amount of each of the metals other than zinc will be deposited preferentially in the cell before the zinc compounds are affected. By arresting the electrolysis at the proper point substantially no zinc will be extracted; and the remainder of the soluble salts of other metals may be removed as desired, a zinc box of the usual type being suitable for the purpose. It will be understood that the same principle may be applied to solutions from the leaching of compounds of metals other than zinc in a manner which will be apparent to those skilled in the art. The conditions under which the preliminary electrolysis takes place are such that very little power will be actually consumed in this step.

The solution will then be a pure solution of zinc chloride with a small amount of zinc bromide, according to the quantity of bromine originally employed. This solution is decomposed preferably by electrolysis in the usual way, a diaphragm cell being practically necessary to prevent action between the halogen liberated at the anode and the zinc in the cathode chamber. During electrolysis the bromine would be liberated first, and would dissolve in the electrolyte, as the latter would contain a substantial amount of a halogen salt such as zinc chloride. Chlorine would next be evolved, principally as a gas; but the electrolysis should be stopped before the solution reaches a point where all bromine present is not readily held in solution.

The gaseous chlorine evolved during electrolysis may be returned to the original leaching step, and the liquor discharged from the cathode chamber, containing bromine in solution, may be returned for further leaching, thus producing a cyclic process in which substantial quantities of ore may be continuously treated.

There may be a tendency for certain impurities to build up in the leaching solution; and to counteract this tendency and prevent such impurities from passing a predetermined concentration a portion of the purified solution may be subjected to electrolysis in a separate cell from which the chlorine is returned to the leaching system while the liquor after treatment in such cell is removed from the system. In zinc leaching for instance, this auxiliary cell may be employed to remove excess sulfuric acid from the system.

It is believed that the initial reaction between the blende and bromine is generally represented by the following equation:

$$3ZnS + 6Br_2 + 3H_2O = 3ZnBr_2 + 6HBr + 2S + SO_3.$$

The effect of introducing chlorine into this solution may be indicated as follows:

$$3ZnBr_2 + 6Cl = 3ZnCl_2 + 6Br.$$

When the solution is passed through zinc oxide, the hydrobromic acid is changed as follows:

$$6HBr + 3ZnO = 3ZnBr_2 + 3H_2O.$$

The zinc bromide may if desired be changed to the chloride in the manner indicated above; but as the amount of hydrobromic acid or other bromine compound other than metallic bromides, is ordinarily rather small in proportion to the total amount of bromine, the zinc bromide formed in this step may be passed through the system and finally decomposed in the electrolytic step. The $SO_3$ in the product of the first reaction may be combined with a further amount of zinc oxide in the following manner:

$$SO_3 + ZnO = ZnSO_4.$$

This sulfate is decomposed in the electrolytic cell, producing further $SO_3$; and any excess of the latter may be prevented from building up in the system as already indicated.

While the above equations are believed to represent the reactions which take place in this process, they are primarily intended to be illustrative; and it is recognized that other compounds may be formed, which however will respond to treatment by the process set forth herein to produce the results indicated.

Other objects and advantages of the invention will be further apparent to those skilled in the art from the following detailed description taken in connection with the accompanying drawings, in which—

Figure 2:
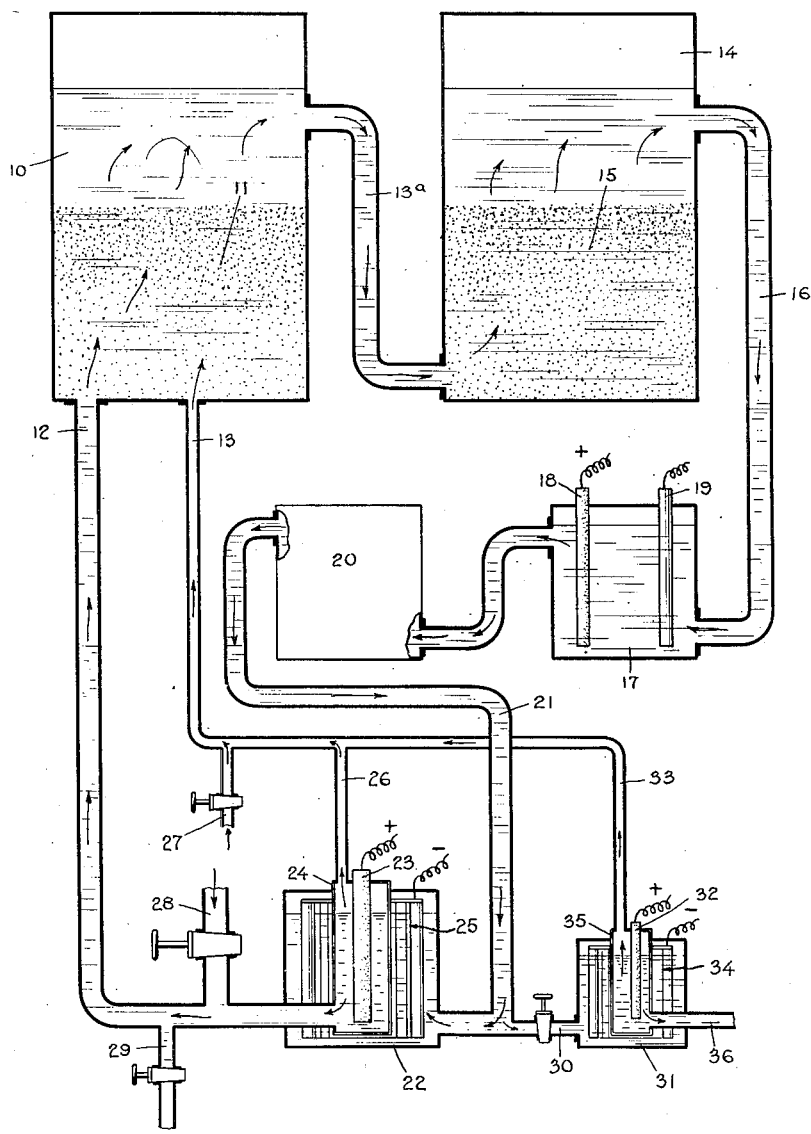

Fig. 1 is a flowsheet of one arrangement of apparatus suitable for carrying out the process, and Fig. 2 is a more detailed showing similar in arrangement, disclosing the same apparatus.

The form illustrated is of the type in which ore or other suitable compound is subjected to the leaching action in a suitable container, the leach liquor then passing through a substance suitable for reacting with the acids in the solution, such as roasted ore in a separate container. The solution then passes through the respective purifying and decomposing steps and is returned to the original container for further leaching action. The substance to be leached, which may be zinc blende ground to suitable fineness such as 80 mesh, is placed in a suitable leaching tank 10 forming a pervious body 11 therein through which the leach liquor containing bromine in solution is introduced through pipe 12, and gaseous chlorine is introduced through pipe 13, in such a manner that the liquor and chlorine will tend to pass through substantially the entire mass of solid material 11. The solution flows through pipe 13ª into a further leaching tank 14 in such a manner that the solution will pass through a body of a substance 15, such as roasted blende, capable of combining suitably with the acid constituent of the solution.

The neutralized solution from tank 14 will then flow through pipe 16 into electrolytic cell 17 which in the treatment of zinc preferably includes a zinc anode 18 and a cathode 19 which may be of lead. The cell is designed so that the period of treatment of the solution will be sufficient to decompose the soluble salts of the metallic impurities, including particularly lead, silver and copper; but will not be sufficient to remove any substantial amount of zinc, which appears only after the other metals have been largely deposited. The solution from the cell 17 is then passed through suitable apparatus such as zinc box 20 of any standard type for removing the last traces of metallic impurities.

The solution discharged from apparatus 20, as already noted, is a substantially pure solution of zinc chloride with a little zinc bromide and zinc sulfate. This flows through pipe 21 into diaphragm cell 22. The chlorine will be released at the anode 23 and collects within the diaphragm 24 in the usual manner to prevent reaction with the zinc deposited at the cathode 25. The zinc may be removed from the cell in standard manner. The chlorine is permitted to escape continuously from the anode chamber through pipe 26, connecting with pipe 13 which feeds gas into the original leaching chamber 10. The bromine however goes into solution and passes out into pipe 12, returning to leaching chamber 10.

Suitable arrangements for adding makeup quantities of chlorine, bromine and fresh solution may be employed, the illustrated arrangement including valved supply pipes 27 for chlorine connected with the feed pipe 13, 28 for solution connecting with feed pipe 12, and 29 for bromine also connecting with the solution line 12, as the bromine will be promptly dissolved in the solution owing to the presence of a certain amount of halogen salt therein.

For bleeding off a suitable amount of solution to prevent building up of undesirable impurities, such as sulfuric acid, a valved bleeder pipe 30 connects the solution line 21 with a diaphragm cell 31 in which the operation is identical with that in cell 22, the chlorine released at the cathode 32 passing through pipe 33 into pipe 13, the zinc deposited at the anode 34 being removed from the cell in the usual manner, diaphragm 35 maintaining the separation between the chlorine and zinc. The solution from the cathode chamber, which will contain a certain amount of sulfuric acid and possibly other impurities, passes out of the system through pipe 36.

The end of the process can readily be determined by the appearance of substantial amounts of gaseous chlorine at the top of the leaching chamber. When this occurs the ore in tank 10 will of course be replaced by fresh ore. It will be apparent that numerous variations in the flow-sheet indicated may be introduced. For instance, while it is generally believed to be more convenient to pass the solution successively through raw and roasted ore, it is of course entirely practicable to mix the raw and roasted ore in suitable proportions. The return of the leaching solution directly from the cells to the ore is capable of variations, since it may conceivably be advantageous to utilize directly the sulfuric acid which is in solution in the liquor discharged from the electrolysis step. At the present price of bromine however it appears to be more economical to return the cell effluent to the leaching operation.

While the invention as already indicated is primarily directed to improvements in the leaching of zinc blende, it may also be applicable to other analogous operations; and those skilled in the art will be enabled from the above description to substitute the appropriate chemical substances encountered in such other operations for those mentioned in the foregoing specification.

We claim:—

1. A process for extracting metals which includes the formation of a metallic halogen compound and the replacement of the halogen in such compound by another halogen.

2. A process for extracting metals which includes the formation of a bromine compound and the replacement of the bromine in such compound by another halogen.

3. A process for extracting metals which includes leaching a metallic compound with bromine in a halogen salt solution and replacing the bromine in the resulting metallic bromide by another halogen.

4. A process for extracting metals which includes the formation of a metallic halogen compound and the replacement of the halogen in such compound by chlorine.

5. A process for extracting metals which includes the formation of a metallic bromine compound and the replacement of the bromine in such compound by chlorine.

6. A process for extracting metals which includes the formation of a metallic halogen compound, the replacement of the halogen in the compound by a second halogen with the production of a solution of the latter compound, and the decomposition of the latter compound by electrolytic methods, with the regeneration of the second halogen.

7. A process for extracting metals which includes treatment of a metal compound with a halogen in an amount sufficient only to transform a portion of the metal compound into a compound of such halogen, and the replacement of the halogen in the latter compound by another halogen, thereby releasing the first halogen for further combination with a portion of the original compound, the first halogen being present in such small amounts and the second halogen in such excess that the first halogen reacts successively with a plurality of portions of the original metallic compound and is successively released by substitution of the second halogen therefor.

8. A process of extracting metals which includes treatment of a metallic compound with bromine in quantities sufficient to combine with only a part of the metallic compound, and the replacement of the bromine in the compound thus formed with chlorine, the chlorine being present in sufficient quantity so that as the bromine combines with successive portions of the metallic compound it is successively freed by replacement with chlorine.

9. A process for extracting zinc from blende which includes the formation of zinc bromide from the blende by treatment with a quantity of bromine insufficient to combine with all of the blende, and the replacement of the bromine in such bromide with chlorine, the bromine being thereby released and combining with a further amount of blende, the bromine and chlorine being present in such quantities and under such conditions that the bromine will combine successively with portions of the blende, and is released successively by replacement with chlorine.

10. A process for extracting metals which includes the formation of a metallic halogen compound, the replacement of the halogen in the compound by another halogen to form a second metallic halogen compound in solution, and neutralizing the solution thus formed.

11. A process for extracting metals which includes the formation of a metallic bromide, the replacement of the bromine in the bromide by chlorine to form a metallic chloride in solution, and the treatment of such solution with a reagent adapted to break up acids in the solution.

12. A process for extracting zinc from blende which includes the formation of zinc bromide by treatment of the blende with bromine, transforming the bromide to a chloride in solution, and neutralizing any acids present in such solution.

13. A process for extracting zinc from blende which includes leaching the blende with bromine in a solution of a halogen salt, the amount of bromine present being substantially less than that necessary to transform all of the zinc sulfide into zinc bromide, and passing chlorine gas into contact with the portion of the blende upon which the bromine reacts.

14. A process for extracting metals from ores which includes the formation of a metallic halogen compound from raw ore, the replacement of the halogen in the compound by another halogen to form a metallic halogen compound in acid solution, and treatment of the acid solution with roasted ore.

15. A process for extracting zinc from blende which includes the treatment of blende to form zinc bromide, transforming the bromide into zinc chloride in solution, and treatment of the solution with roasted blende.

16. A process for extracting metals which includes the formation of a metallic compound which may be decomposed by electrolysis from solution, and treatment of the solution of such compound by preliminary electrolysis to remove selectively a substantial portion of compounds of metals which are removed by electrolysis preferentially to another metal that is present.

17. A process for extracting metals which includes the formation of a metallic compound which may be decomposed by electrolysis from solution; treatment of the solution of such compound by preliminary electrolysis to remove selectively a substantial portion of compounds of other metals which are removed by electrolysis preferentially to a principal metal present, and the removal of the balance of such other metallic compounds prior to electrolysis of the solution for recovery of the principal metal in the original compound.

18. A process for extracting zinc from blende which includes the formation of a zinc compound in solution capable of decomposition by electrolysis, and the removal from such solution of a substantial portion of compounds of metals other than zinc by preliminary electrolysis.

19. A process for extracting zinc from blende which includes the formation of a zinc compound in solution capable of decomposition by electrolysis, the preliminary purification of the solution by electrolytic decomposition of a substantial part of the compounds of other metals that are present, and a final purification by precipitation of the residue of such other metals on finely divided zinc.

20. A process of extracting metals which includes the formation, by an operation including treatment with a gaseous reagent, of a metallic compound in solution capable of decomposition by electrolysis; subsequent electrolysis of the solution with the regeneration of the gaseous reagent; and the return of such regenerated reagent for further extraction.

21. A process of extracting zinc from blende which includes treatment of the blende to produce a solution of zinc chloride, electrolysis of the solution to extract the zinc and generate chlorine, and use of such chlorine to produce zinc chloride from a further quantity of blende.

22. A process of extracting zinc from blende which includes treatment of the blende with bromine to form zinc bromide, treatment of the bromide with chlorine to produce zinc chloride in solution, electrolysis of the solution to obtain zinc therefrom, return of the barren solution from the electrolysis step for further leaching of blende, and the removal of a portion of such barren solution from the system by withdrawing same from one of the cells employed in electrolysis.

EDWIN W. HALE.
COLIN G. FINK.